(12) United States Patent
Orr

(10) Patent No.: US 9,241,005 B1
(45) Date of Patent: *Jan. 19, 2016

(54) METHOD AND APPARATUS FOR UPDATING PATTERNS OF PACKETS THROUGH A NETWORK DEVICE BASED ON DETECTION OF AN ATTACK

(71) Applicant: Marvell International Ltd., Hamilton (BM)

(72) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 31 days.

This patent is subject to a terminal disclaimer.

(21) Appl. No.: 14/187,662

(22) Filed: Feb. 24, 2014

Related U.S. Application Data

(63) Continuation of application No. 13/245,501, filed on Sep. 26, 2011, now Pat. No. 8,661,241, which is a continuation of application No. 11/170,904, filed on Jun. 29, 2005, now Pat. No. 8,028,160.

(60) Provisional application No. 60/685,524, filed on May 27, 2005.

(51) Int. Cl.
*H04L 29/06* (2006.01)

(52) U.S. Cl.
CPC .......... *H04L 63/1416* (2013.01); *H04L 63/14* (2013.01); *H04L 63/1408* (2013.01); *H04L 63/1433* (2013.01)

(58) Field of Classification Search
CPC . H04L 63/1416; H04L 63/14; H04L 63/1408; H04L 63/1433

USPC .......... 726/22, 23, 24; 709/224, 225
See application file for complete search history.

(56) References Cited

U.S. PATENT DOCUMENTS

| | | | |
|---|---|---|---|
| 7,099,320 B1 * | 8/2006 | Salerno .................. 370/389 |
| 7,234,163 B1 | 6/2007 | Rayes et al. |
| 7,254,114 B1 * | 8/2007 | Turner ............... H04L 41/142 370/244 |
| 7,331,061 B1 | 2/2008 | Ramsey et al. |
| 7,392,543 B2 | 6/2008 | Szor |
| 7,463,590 B2 | 12/2008 | Mualem et al. |
| 7,490,235 B2 | 2/2009 | Khosmood et al. |
| 7,512,980 B2 | 3/2009 | Copeland et al. |
| 7,626,938 B1 | 12/2009 | Orr et al. |
| 7,646,770 B1 | 1/2010 | Parker |
| 7,681,235 B2 * | 3/2010 | Chesla et al. ............ 726/23 |
| 7,715,800 B2 | 5/2010 | Sinha |
| 7,769,024 B1 * | 8/2010 | Orr ................... 370/395.32 |
| 7,787,390 B1 | 8/2010 | Orr |
| 7,849,506 B1 * | 12/2010 | Dansey ............ H04L 49/208 713/188 |

(Continued)

*Primary Examiner* — Sarah Su

(57) ABSTRACT

A network device including a first and second processors. The first processor: receives first and second packets; and selects some of the second packets according to contents of the second packets and sampling criteria. The second processor operates in first and second modes. While operating in the first mode, the second processor learns a traffic pattern of the first packets through the network device. While operating in the second mode, the second processor compares a traffic pattern of the some of the second packets to the traffic pattern of the first packets to determine whether the second packets are associated with an attack on the network device. In response to determining the second packets are not associated with an attack on the network device, the second processor updates the patterns of the first packets based on a characteristic of the some of the second packets.

20 Claims, 3 Drawing Sheets

(56) References Cited

U.S. PATENT DOCUMENTS

| | | |
|---|---|---|
| 7,886,358 B2 | 2/2011 | Copeland, III |
| 8,411,687 B1 * | 4/2013 | Orr ............ 370/395.32 |
| 8,948,188 B1 * | 2/2015 | Orr ............ 370/395.32 |
| 2002/0069356 A1 | 6/2002 | Kim |
| 2002/0165947 A1 | 11/2002 | Akerman et al. |
| 2003/0200439 A1 | 10/2003 | Moskowitz |
| 2004/0003094 A1 | 1/2004 | See |
| 2004/0034800 A1 | 2/2004 | Singhal et al. |
| 2004/0062199 A1 | 4/2004 | Lau et al. |
| 2004/0083385 A1 | 4/2004 | Ahmed et al. |
| 2004/0093513 A1 | 5/2004 | Cantrell et al. |
| 2004/0172557 A1 | 9/2004 | Nakae et al. |
| 2004/0230834 A1 | 11/2004 | McCallam |
| 2004/0255157 A1 | 12/2004 | Ghanea-Hercock |
| 2005/0213504 A1 | 9/2005 | Enomoto et al. |
| 2005/0262560 A1 | 11/2005 | Gassoway |
| 2005/0276230 A1 | 12/2005 | Akahane et al. |
| 2006/0075093 A1 | 4/2006 | Frattura et al. |
| 2006/0095968 A1 | 5/2006 | Portolani et al. |
| 2006/0123479 A1 | 6/2006 | Kumar et al. |
| 2006/0128406 A1 | 6/2006 | Macartney |
| 2006/0149965 A1 | 7/2006 | Sharma |
| 2006/0223495 A1 | 10/2006 | Cassett et al. |
| 2006/0242694 A1 | 10/2006 | Gold et al. |
| 2007/0157306 A1 | 7/2007 | Elrod et al. |
| 2007/0199070 A1 | 8/2007 | Hughes |
| 2007/0280222 A1 | 12/2007 | Smith et al. |
| 2008/0098476 A1 | 4/2008 | Syversen |
| 2008/0196104 A1 | 8/2008 | Tuvell et al. |
| 2008/0250496 A1 | 10/2008 | Namihira |
| 2009/0028045 A1 | 1/2009 | Stellenberg et al. |
| 2009/0028144 A1 | 1/2009 | Blair |
| 2010/0103837 A1 | 4/2010 | Jungck et al. |
| 2011/0213869 A1 | 9/2011 | Korsunsky et al. |
| 2011/0238855 A1 | 9/2011 | Korsunsky et al. |
| 2012/0023572 A1 * | 1/2012 | Williams, Jr. ......... G06F 21/552 726/13 |

* cited by examiner

METHOD AND APPARATUS FOR UPDATING PATTERNS OF PACKETS THROUGH A NETWORK DEVICE BASED ON DETECTION OF AN ATTACK

CROSS-REFERENCE TO RELATED APPLICATIONS

This present disclosure is a continuation of U.S. application Ser. No. 13/245,501 (now U.S. Pat. No. 8,661,241), filed Sep. 26, 2011, which is a continuation of U.S. application Ser. No. 11/170,904 (now U.S. Pat. No. 8,028,160), filed on Jun. 29, 2005. This application claims the benefit of U.S. Provisional Application No. 60/685,524, filed on May 26, 2005. The entire disclosures of the applications referenced above are incorporated herein by reference.

BACKGROUND

The present invention relates generally to data communications. More particularly, the present invention relates to a data link layer switch with protection against Internet Protocol spoofing.

Secure data communications networks such as corporate intranets are the subject of increasingly numerous and sophisticated attacks from outside the network. One common component of such attacks, referred to as Internet Protocol (IP) spoofing, alters the IP source address of packets transmitted by the attacker. One purpose of IP spoofing is to conceal the identity of the attacker.

Another purpose of IP spoofing is to present the attacker as a user within the secure intranet under attack. Because devices within a secure intranet trust each other, an attacker masquerading as such a device can do more damage than an attacker that appears to be outside the network. For example, an attacker could transmit packets to a local-area network (LAN) using a altered or "spoofed" address of 192.168.1.200. Because this is the form of the internal IP addresses for many small LANs, the attacker may be accepted as a computer within the LAN.

SUMMARY

A network device is provided and includes a first and second processors. The first processor is configured to: receive first and second packets; and select some of the second packets according to contents of the second packets and sampling criteria. The second processor is configured to operate in first and second modes. While operating in the first mode, the second processor is configured to learn a traffic pattern of the first packets through the network device. While operating in the second mode, the second processor is configured to compare a traffic pattern of the some of the second packets to the traffic pattern of the first packets to determine whether the second packets are associated with an attack on the network device. In response to determining the second packets are not associated with an attack on the network device, the second processor is configured to update the patterns of the first packets based on a characteristic of the some of the second packets.

A method is provided and includes: receiving a first packets and a second packets at a first processor; selecting some of the second packets according to (i) contents of the second packets, and (ii) sampling criteria; during a first mode of operation of a second processor, learning, via the second processor, a traffic pattern of the first packets through the network device; and during a second mode of operation of the second processor, comparing, via the second processor, a traffic pattern of the some of the second packets to the pattern of the first packets to determine whether the second packets are associated with an attack on a network device. In response to determining the second packets are not associated with an attack on the network device, updating the traffic pattern of the first packets based on a characteristic of the some of the second packets.

In general, in one aspect, the invention features a network switch including a plurality of ports, a packet processor, and a first processor. The plurality of ports are configured to receive a plurality of packets transmitted from a network to the network switch. The packet processor comprises a classifier configured to select a subset of the plurality of packets according to sampling criteria. The first processor is configured to determine, based on the subset of the plurality of packets, whether the plurality of packets are associated with an attack on the network switch. The classifier is further configured to, prior to the first processor determining whether the plurality of packets are associated with an attack, copy the subset of the plurality of packets to the first processor while maintaining the plurality of packets in the packet processor.

In general, in one aspect, the invention features a data link layer switch comprising: a processor; a plurality of ports to exchange packets of data with a network; a memory to store a switch table; and a packet processor to transfer the packets of data between the ports according to the switch table, the packet processor comprising a classifier to send copies of selected ones of the packets of data to the processor; wherein the processor determines whether an attack upon the data link layer switch has occurred based on the copies of the selected ones of the packets.

Some embodiments comprise an alarm unit to manifest an indication of the attack when the processor determines that the attack upon the data link layer switch has occurred. Some embodiments comprise a blocking unit to block the packets of data that are related to an attack when the processor determines that the attack upon the data link layer switch has occurred. In some embodiments, the classifier identifies the selected ones of the packets of data according to at least one of the group consisting of: contents of the packets of data; sampling criteria describing the packets of data; and a sampling algorithm. In some embodiments, the sampling criteria describing the packets of data comprise at least one of the group consisting of: destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data. In some embodiments, the memory stores a table of data flows describing traffic patterns of the packets of data; wherein the processor modifies the table of data flows based on characteristics of the selected ones of the packets of data; and wherein the processor determines whether the attack upon the data link layer switch has occurred based on the contents of the table of data flows. In some embodiments, the table of data flows comprises at least one of the group consisting of: destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interfaces; wherein the table of data flows comprises a plurality of forwarding entries each comprising an Internet Protocol (IP) address and an identifier of the one of the switch interfaces from which packets having the IP address as a destination address should be transmitted; and wherein the processor determines that an attack upon the data link layer switch has occurred when none of the forwarding entries comprises both (1) the IP source address of one of the packets, and (2) an identifier of the one of the switch interfaces on which the one of the packets was received.

In general, in one aspect, the invention features a data link layer switch comprising: means for processing; port means for exchanging packets of data with a network; memory means for storing a switch table; and packet processor means for transferring the packets of data between the port means according to the switch table, the packet processor means comprising classifier means for sending copies of selected ones of the packets of data to the processor means; wherein the processor means determines whether an attack upon the data link layer switch has occurred based on the copies of the selected ones of the packets.

Some embodiments comprise means for manifesting an indication of the attack when the processor means determines that the attack upon the data link layer switch has occurred. Some embodiments comprise means or blocking the packets of data that are related to an attack when the processor means determines that the attack upon the data link layer switch has occurred. In some embodiments, the classifier means identifies the selected ones of the packets of data according to at least one of the group consisting of: contents of the packets of data; sampling criteria describing the packets of data; and a sampling algorithm. In some embodiments, the sampling criteria describing the packets of data comprise at least one of the group consisting of: destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data.

In some embodiments, the memory means stores a table of data flows describing traffic patterns of the packets of data; wherein the processor means modifies the table of data flows based on characteristics of the selected ones of the packets of data; and wherein the processor means determines whether the attack upon the data link layer switch has occurred based on the contents of the table of data flows. In some embodiments, the table of data flows comprises at least one of the group consisting of: destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interface means each associated with one or more of the port means; wherein the table of data flows comprises a plurality of forwarding entries each comprising an Internet Protocol (IP) address and an identifier of the one of the switch interface means from which packets having the IP address as a destination address should be transmitted; and wherein the processor means determines that an attack upon the data link layer switch has occurred when none of the forwarding entries comprises the IP source address of one of the packets and an identifier of the one of the switch interface means on which the one of the packets was received.

In general, in one aspect, the invention features a method for a data link layer switch comprising a processor, the method comprising: exchanging packets of data with a network; storing a switch table; and transferring the packets of data between ports of the data link layer switch according to the switch table; sending copies of selected ones of the packets of data to the processor; wherein the processor determines whether an attack upon the data link layer switch has occurred based on the copies of the selected ones of the packets.

Some embodiments comprise, upon determining that an attack upon the data link layer switch has occurred, performing at least one of the group consisting of: manifesting an indication of the attack; and causing the packets of data that are related to the attack to be blocked. Some embodiments comprise identifying the selected ones of the packets of data according to at least one of the group consisting of contents of the packets of data; sampling criteria describing the packets of data; and a sampling algorithm. In some embodiments, the sampling criteria describing the packets of data comprise at least one of the group consisting of: destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data. Some embodiments comprise storing a table of data flows describing traffic patterns of the packets of data; modifying the table of data flows based on characteristics of the selected ones of the packets of data; and determining whether the attack upon the data link layer switch has occurred based on the contents of the table of data flows. In some embodiments, the table of data flows comprises at least one of the group consisting of: destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interfaces, further comprising storing in the table of data flows a plurality of forwarding entries each comprising an Internet Protocol (IP) address and an identifier of the one of the switch interfaces from which packets having the IP address as a destination address should be transmitted; and determining that an attack upon the data link layer switch has occurred when none of the forwarding entries comprises the IP source address of one of the packets and an identifier of the one of the switch interfaces on which the one of the packets was received.

In general, in one aspect, the invention features a computer program for a data link layer switch that exchanges packets of data with a network, the computer program comprising examining copies of selected ones of the packets of data; and determining whether an attack upon the data link layer switch has occurred based on the copies of the selected ones of the packets.

Some embodiments comprise, upon determining that an attack upon the data link layer switch has occurred, performing at least one of the group consisting of manifesting an indication of the attack; and causing the packets of data that are related to the attack to be blocked. Some embodiments comprise identifying the selected ones of the packets of data according to at least one of the group consisting of contents of the packets of data; sampling criteria describing the packets of data; and a sampling algorithm. In some embodiments, the sampling criteria describing the packets of data comprise at least one of the group consisting of destination addresses of the packets of data; source addresses of the packets of data; identifiers of switch interfaces of the data link layer switch receiving the packets of data into the data link layer switch; identifiers of switch interfaces of the data link layer switch transmitting the packets of data from the data link layer switch; data rates of the packets of data; quantities of data in the packets of data; identifiers of other network devices in the paths of the packets of data; and times of occurrence of the packets of data. Some embodiments comprise storing a table of data flows describing traffic patterns of the packets of data; modifying the table of data flows based on characteristics of the selected ones of the packets of data; and determining whether the attack upon the data link layer switch has occurred based on the contents of the table of data flows. In some embodiments, the table of data flows comprises at least one of the group consisting of destination addresses of packets in the data flows; source addresses of packets in the data flows; identifiers of switch interfaces of the data link layer switch receiving the data flows into the data link layer switch; identifiers of switch interfaces of the data link layer switch transmitting the data flows from the data link layer switch; data rates of the data flows; quantities of data in the data flows; identifiers of other network devices involved in the data flows; and times of occurrence of the data flows. In some embodiments, the data link layer switch comprises a plurality of switch interfaces, and the computer program further comprises storing in the table of data flows a plurality of forwarding entries each comprising an Internet Protocol (IP) address and an identifier of the one of the switch interfaces from which packets having the IP address as a destination address should be transmitted; and determining that an attack upon the data link layer switch has occurred when none of the forwarding entries comprises the IP source address of one of the packets and an identifier of the one of the switch interfaces on which the one of the packets was received.

The details of one or more implementations are set forth in the accompanying drawings and the description below. Other features will be apparent from the description and drawings, and from the claims.

DETAILED DESCRIPTION

Embodiments of the present invention provide data link layer switches with protection against Internet Protocol (IP) spoofing attacks. Data link layer switches according to preferred embodiments of the present invention collect data describing the data flows traversing the switch to establish characteristic traffic patterns for the switch. When subsequent data flows vary significantly from these characteristic traffic patterns, an attack upon the switch is declared.

Preferably the data link layer switch operates in two phases. First, in an initialization phase, the switch learns the traffic patterns by examining the data flows comprising the traffic and populating a data flow table based on this examination, as described below. Thereafter, the switch operates in a protection phase, in which the switch compares the patterns of the data flows in the switch traffic to the patterns in the data flow table to determine whether an attack upon the switch has occurred. Further, the switch can continue to learn traffic patterns during the protection phase.

Figure 1:
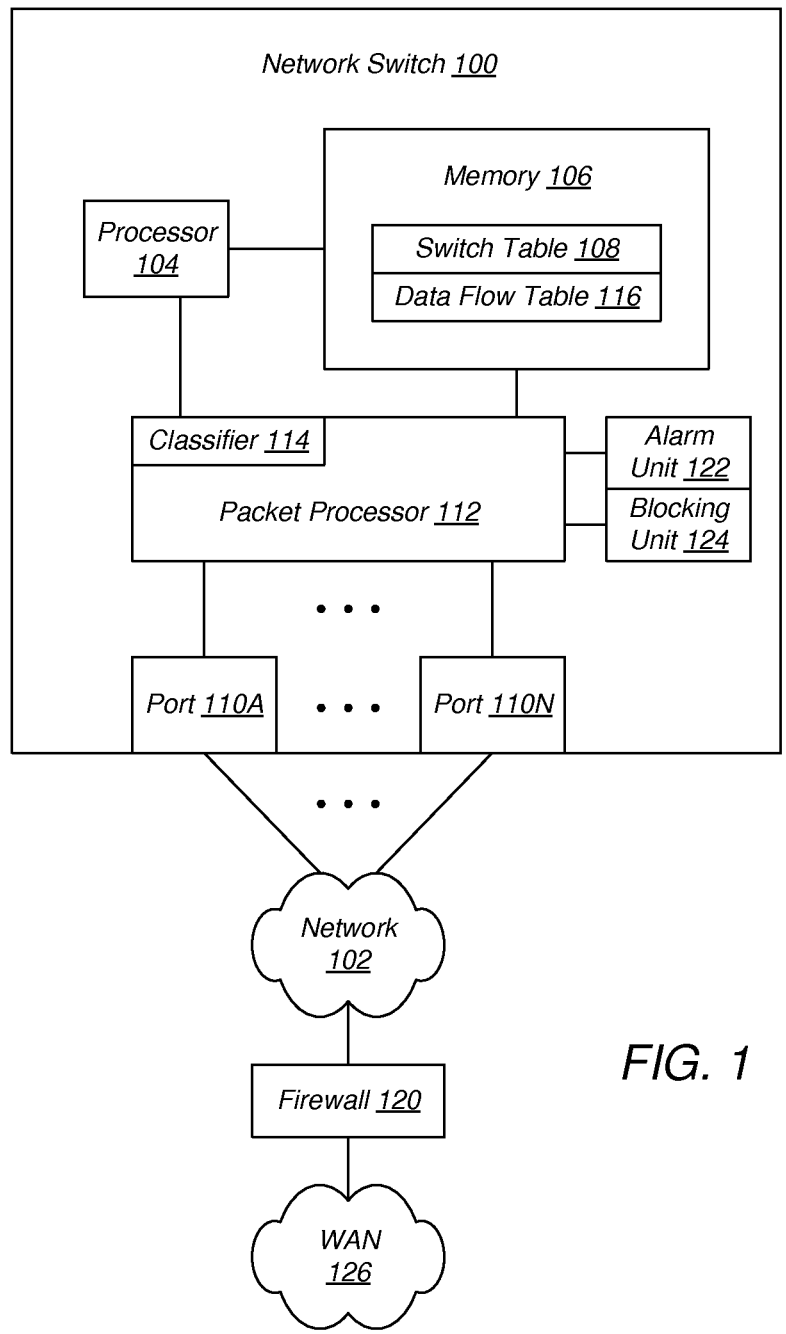
FIG. 1 shows a data link layer switch in communication with a network according to a preferred embodiment of the present invention.

FIG. 1 shows a data link layer switch 100 in communication with a network 102 according to a preferred embodiment of the present invention. A data link layer switch is a network switch that forwards traffic at the data link layer (that is, layer 2 of the Open Systems Interconnection (OSI) Reference Model), but does not route traffic at the network layer (that is, layer 3 of the OSI Reference Model), as is well-known in the relevant arts. Network 102 can be a local-area network such as a corporate intranet or the like, and is generally protected from attackers on a wide-area network 126 such as the Internet by a firewall 120, although this is not required.

Switch 100 comprises a processor 104, a memory 106 to store a switch table 108, a plurality of ports 110A-N to exchange packets of data with network 102, and a packet processor 112 to transfer the packets of data between ports 110 according to switch table 108. Packet processor 112 comprises a classifier 114 to determine properties of the packets, and to direct the packets accordingly. In some embodiments, switch 100 additionally comprises an alarm unit 122 and a blocking unit 124.

Data link layer switch 100 can be fabricated as one or more semiconductors. Memory 106 can be fabricated as part of one or more of the semiconductors.

Figure 2:
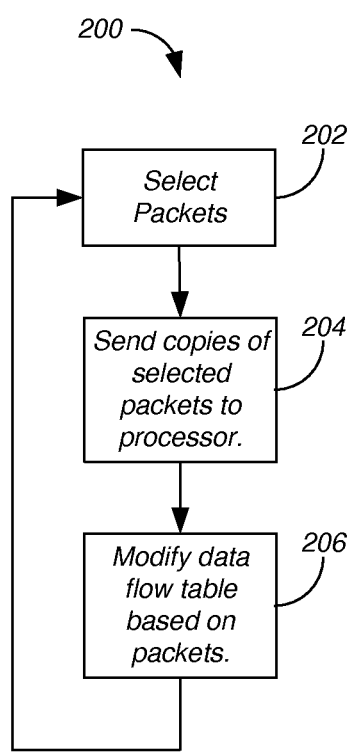
FIG. 2 shows an initialization process for the data link layer switch of FIG. 1 for learning traffic patterns in the data flows traversing the switch according to a preferred embodiment of the present invention.

FIG. 2 shows an initialization process 200 for data link layer switch 100 for learning traffic patterns in the data flows traversing switch 100 according to a preferred embodiment of the present invention. Classifier 114 selects some or all of the packets of data that traverse switch 100 (step 202), and sends a copy of each of the selected packets to processor 104 (step 204). Because network traffic patterns generally do not change rapidly, a small sample of the packets is sufficient to produce accurate characteristic network traffic patterns.

In some embodiments, classifier 114 selects the packets based on data contained in the packet, for example in the packet header. In some embodiments, classifier 114 selects the packets based on sampling criteria describing the packets. For example, packets can be selected based on destination addresses of the packets, source addresses of the packets, identifiers of switch interfaces of the data link layer switch 100 receiving the packets into the data link layer switch 100, identifiers of switch interfaces of the data link layer switch 100 transmitting the packets from the data link layer switch 100, data rates of the packets, quantities of data in the packets, identifiers of other network devices in the paths of the packets, times of occurrence of the packets, or the like, or any combination thereof. The packets can also be selected using a sampling algorithm such as a statistical sampling algorithm. However, embodiments of the present invention are independent of the manner of selection of the packets.

Memory 106 preferably stores a data flow table 116 that describes traffic patterns of the packets of data, preferably according to the data flows comprising the packets. In some embodiments the data flows can be defined by specifying a value or range of values for all or part of one or more fields in each packet in the data flow. For example, these fields can represent the media access control (MAC) or Internet protocol (IP) source address of the packet, the transport control protocol (TCP) or user datagram protocol (UDP) destination port of the packet, the protocol type of the packet, and so on. In some embodiments each data flow is defined as an ordered set of packets transmitted from one network device to another. Some embodiments define other types of data flows. However, embodiments of the present invention are independent of the manner in which data flows are defined.

Processor 104 modifies data flow table 116 based on characteristics of the selected ones of the packets of data (step 206). Data flow table 116 can include destination addresses of packets in the data flows, source addresses of packets in the data flows, identifiers of switch interfaces of the data link layer switch 100 receiving the data flows into the data link layer switch 100, identifiers of switch interfaces of the data link layer switch 100 transmitting the data flows from the data link layer switch 100, data rates of the data flows, quantities of data in the data flows, identifiers of other network devices involved in the data flows, times of occurrence of the data flows, and the like. However, embodiments of the present invention are independent of the particular packet characteristics used to modify data flow table 116.

Process 200 then resumes at step 202, and repeats until the initialization phase is complete.

Figure 3:
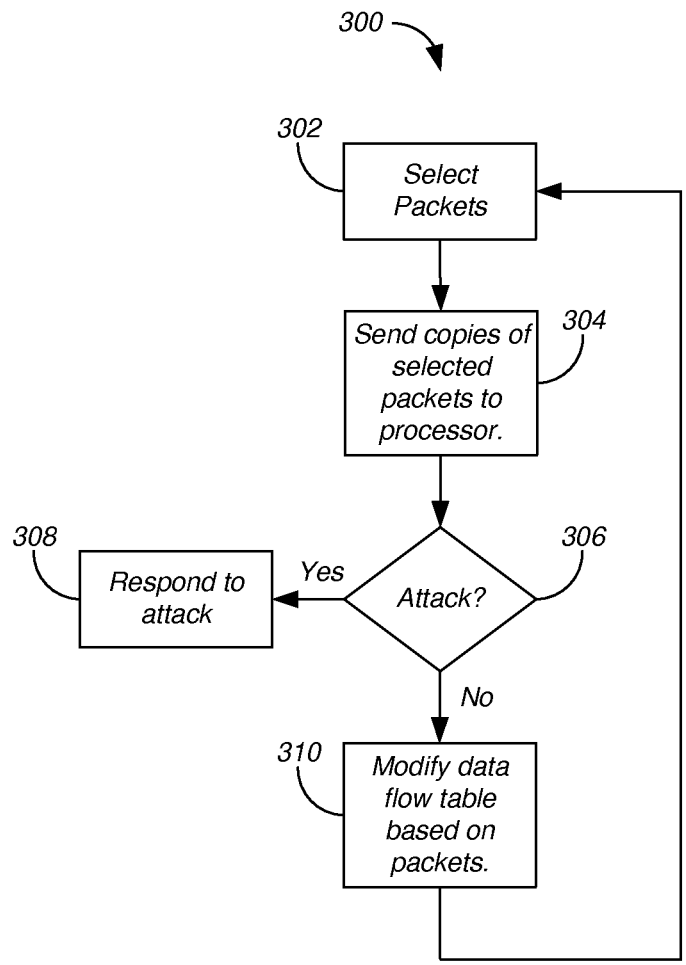
FIG. 3 shows a protection process for the data link layer switch of FIG. 1 for detecting and handling an IP spoofing attack according to a preferred embodiment of the present invention The leading digit(s) of each reference numeral used in this specification indicates the number of the drawing in which the reference numeral first appears.

FIG. 3 shows a protection process 300 for data link layer switch 100 for detecting and handling an IP spoofing attack according to a preferred embodiment of the present invention. Classifier 114 selects some or all of the packets of data that traverse switch 100 (step 302), for example as described above for process 200 of FIG. 2. Classifier 114 sends a copy of each of the selected packets to processor 104 (step 304). Because classifier 114 preferably selects only those packets that belong to new data flows, only a small portion of the packets of data that traverse switch 100 are selected, copied and sent to processor 104. Therefore processor 104 is not unduly burdened. In addition, classifier 114 examines the original packets (not copies) in silicon. Therefore no copies are made for most packets.

Processor 104 determines whether an attack upon switch 100 has occurred (step 306) based on the copies of the packets. Preferably processor 104 determines whether an attack has occurred by comparing the patterns of the data flows comprising the selected packets to the patterns in data flow table 116. For example, if data flow table 116 shows that a particular computer normally generates traffic only during regular business hours, but the selected packets show significant traffic with that computer late at night, an attack could have occurred. As a further example, if data flow table 116 shows that a particular computer normally generates a small amount of traffic, but the selected packets show a large amount of traffic with that computer, an attack could have occurred. Of course, these are only examples. Any sort of criteria can be used to establish patterns and detect attacks based on those patterns.

Preferably switch 100 continues to learn traffic patterns during the protection phase. Therefore, if in step 306 no attack has occurred, processor 104 modifies data flow table 116 based on characteristics of the selected packets of data (step 310), for example as described above for process 200 of FIG. 2. Process 300 then resumes at step 302.

But if at step 306 processor 104 detects an attack, processor 104 responds (step 308). In some embodiments, alarm unit 122 manifests an indication of the attack, for example by sending a message to a system administrator. In some embodiments, blocking unit 124 disrupts the data flow of the attack, for example by causing the packets of data that are related to the attack to be blocked. Of course, processor 104 can employ other responses to the attack. However, embodiments of the present invention are independent of the type of response.

In some embodiments, switch 100 compares the path of a data flow to its reverse path. Switch 100 comprises a plurality of switch interfaces each associated with one or more of ports 110, as is well-known in the relevant arts. Switch 100 determines whether the switch interface that receives a packet from a network device is the same switch interface that would be used to send a packet to that network device. If not, then it is likely that the network device is conducting an IP spoofing attack. This technique for detecting attacks can be used alone or in combination with the techniques described above.

According to these embodiments, data flow table 116 stores forwarding entries each comprising an Internet Protocol (IP) address and an identifier of the switch interface from which packets having the IP address as a destination address should be transmitted. When none of the forwarding entries comprises the IP source address of a packet and an identifier of the one of the switch interfaces on which that packet was received, processor 104 determines that an attack upon data link layer switch 100 has occurred.

A number of implementations of the invention have been described. Nevertheless, it will be understood that various modifications may be made without departing from the spirit and scope of the invention. Accordingly, other implementations are within the scope of the following claims.

What is claimed is:

1. A network device comprising:
   a first processor configured to
      receive a first plurality of packets and a second plurality of packets,
      select some of the second plurality of packets according to (i) contents of the second plurality of packets, and (ii) sampling criteria; and
   a second processor configured to
      operate in a first mode and a second mode,
      while operating in the first mode, the second processor is configured to learn a traffic pattern of the first plurality of packets through the network device,
      while operating in the second mode, the second processor is configured to compare a traffic pattern of the some of the second plurality of packets to the traffic pattern of the first plurality of packets to determine whether the second plurality of packets are associated with an attack on the network device, and
      in response to determining the second plurality of packets are not associated with an attack on the network device based on the comparison of the traffic pattern of the some of the second plurality of packets to the traffic pattern of the first plurality of packets, update the traffic pattern of the first plurality of packets based on a characteristic of the some of the second plurality of packets, wherein the first processor is configured to (i) based on the updated traffic patterns, receive a signal from the second processor indicating whether an attack on the network device has occurred, and (ii) based on whether an attack on the network device has occurred, block one or more of the plurality of second packets from being forwarded from the network device.

2. The network device of claim 1, wherein the first processor is configured to, prior to the first processor determining whether the second plurality of packets are associated with an attack on the network device, copy the some of the second plurality of packets to the second processor while maintaining the second plurality of packets in the first processor.

3. The network device of claim 1, further comprising:
a plurality of ports; and
a memory configured to store the traffic pattern of the first plurality of packets, wherein the memory is configured to store a first table, and
wherein the first processor is configured to transfer the second plurality of packets between the plurality of ports according to contents of the first table.

4. The network device of claim 3, wherein:
the traffic pattern of the first plurality of packets comprise (i) a time of use pattern, and (ii) an amount of use pattern;
the time of use pattern includes dates and times packets are transmitted between (i) the network device and (ii) a second device transmitting the first plurality of packets; and
the amount of use pattern includes (i) periods when packets are transmitted between the network device and the second device, and (ii) an amount of data transmitted between the network device and the second device during the periods.

5. The network device of claim 4, wherein the second processor is configured to:
compare the time of use pattern to a current date and time when the second plurality of packets are received by the network device; and
determine whether an attack upon the network device has occurred based on the comparison.

6. The network device of claim 4, wherein the second processor is configured to:
compare the time of use pattern to (i) a period associated with transmitting the second plurality of packets to the network device, and (ii) an amount of data in the second plurality of packets; and
determine whether an attack upon the network device has occurred based on the comparison.

7. The network device of claim 3, wherein:
the memory is configured to store a second table;
the second table comprises data describing the traffic pattern of the first plurality of packets;
the second processor is configured to, in response to determining the some of the second plurality of packets are not associated with an attack, modify the second table based on the characteristic of the some of the second plurality of packets; and
the second processor is configured to determine, based on contents of the second table, whether an attack upon the network device has occurred.

8. The network device of claim 7, wherein:
In response to determining the second plurality of packets are not associated with an attack on the network device, update the traffic pattern of the first plurality of packets based on a plurality of characteristics of the some of the second plurality of packets;

the plurality of characteristics of the some of the second plurality of packets comprise data rates of the second plurality of packets, an amount of data in the second plurality of packets, and times the second plurality of packets are transmitted to the network device; and
the second processor is configured to determine whether an attack upon the network device has occurred based on (i) the data rates, (ii) the amount of data, and (iii) the times.

9. The network device of claim 7, wherein:
the second table comprises (i) a first identifier of a first switch interface of the network device receiving the first plurality of packets, and (ii) a second identifier of a switch interface of the network device transmitting the first plurality of packets; and
the second processor is configured to determine whether an attack upon the network device has occurred based on the first identifier matching the second identifier.

10. The network device of claim 1, wherein the sampling criteria comprises selecting the some of the second plurality of packets based on (i) destination addresses of the second plurality of packets, and (ii) source addresses of the second plurality of packets.

11. The network device of claim 1, wherein:
the sampling criteria comprises selecting the some of the second plurality of packets based on (i) data rates of the second plurality of packets, (ii) an amount of data in the second plurality of packets, (iii) identifiers of network devices other than the network device in paths of the second plurality of packets, and (iv) a time when the second plurality of packets is received at the network device; and
the first processor is configured to, when selecting the some of the second plurality of packets, select only packets belonging to data newly arrived at the network device.

12. The network device of claim 1, wherein the sampling criteria comprises selecting the some of the second plurality of packets based on:
destination addresses of the second plurality of packets;
source addresses of the second plurality of packets;
identifiers of switch interfaces of the network device receiving the second plurality of packets into the network device;
identifiers of switch interfaces of the network device transmitting the second plurality of packets from the network device;
data rates of the second plurality of packets;
an amount of data in the second plurality of packets;
identifiers of devices other than the network device in paths of the second plurality of packets; and
times of occurrence of the second plurality of packets,
wherein the first processor is configured to, when selecting the some of the second plurality of packets, select only packets belonging to data newly arrived at the network device.

13. The network device of claim 1, further comprising switch interfaces, wherein:
the second processor is configured to detect Internet protocol spoofing including determining whether a switch interface of the network device receiving the second plurality of packets from a device over the network is used to send a packet to the network device; and
the second processor is configured to detect the Internet protocol spoofing when the switch interface is not used to send a packet to the network device.

14. The network device of claim 1, wherein:
the sampling criteria comprises selecting the some of the second plurality of packets based on (i) data rates of the second plurality of packets, (ii) an amount of data in the second plurality of packets, and (iii) times the second plurality of packets are transmitted to the network device; and
the second processor is configured to determine whether an attack upon the network device has occurred based on (i) the data rates, (ii) the amount of data, and (iii) the times.

15. The network device of claim 1, wherein the first processor is configured to, regardless of whether the some of the second plurality of packets are associated with an attack:
select the some of the second plurality of packets; and
send the some of the second plurality of packets to the second processor.

16. The network device of claim 1, further comprising a memory configured to store a table describing the traffic pattern of the first plurality of packets;
the second processor is configured to (i) modify the table based on the characteristic of the some of the second plurality of packets, and (ii) determine whether an attack upon the network device has occurred based on contents of the table; and
the table comprises
destination addresses of first plurality of packets,
source addresses of first plurality of packets,
identifiers of switch interfaces of the network device receiving the first plurality of packets into the network device,
identifiers of switch interfaces of the network device transmitting the first plurality of packets from the network device,
data rates of the first plurality of packets,
an amount of data in the first plurality of packets,
identifiers of devices other than devices involved in transferring the first plurality of packets to the network device, and
times the first plurality of packets are transmitted to the network device.

17. The network device of claim 1, further comprising:
an alarm device configured to indicate an attack in response to the second processor determining an attack upon the network device has occurred; and
a blocking device configured to block packets of the second plurality of packets related to the attack in response to the second processor determining an attack upon the network device has occurred.

18. A method comprising:
receiving a first plurality of packets and a second plurality of packets at a first processor, wherein the first processor is in a network device;
selecting some of the second plurality of packets according to (i) contents of the second plurality of packets, and (ii) sampling criteria;
during a first mode of operation of a second processor, learning, via the second processor, a traffic pattern of the first plurality of packets through the network device;
during a second mode of operation of the second processor, comparing, via the second processor, a traffic pattern of the some of the second plurality of packets to the pattern of the first plurality of packets to determine whether the second plurality of packets are associated with an attack on the network device;
in response to determining the second plurality of packets are not associated with an attack on the network device, updating the traffic pattern of the first plurality of packets based on a characteristic of the some of the second plurality of packets;
based on the updated traffic patterns, receiving a signal from the second processor at the first processor indicating whether an attack on the network device has occurred; and
based on whether an attack on the network device has occurred, blocking, at the first processor, one or more of the plurality of second packets from being forwarded from the network device.

19. The method of claim 18, further comprising, prior to determining whether the second plurality of packets are associated with an attack on the network device and while maintaining the second plurality of packets in the first processor, copying the some of the second plurality of packets via the first processor and providing the some of the second plurality of packets to the second processor.

20. The method of claim 18, further comprising sending the some of the second plurality of packets from the first processor to the second processor regardless of whether the some of the second plurality of packets are associated with an attack,
wherein the some of the second plurality of packets are selected regardless of whether the some of the second plurality of packets are associated with an attack.

* * * * *